May 10, 1938.  D. LEWIS  2,117,182

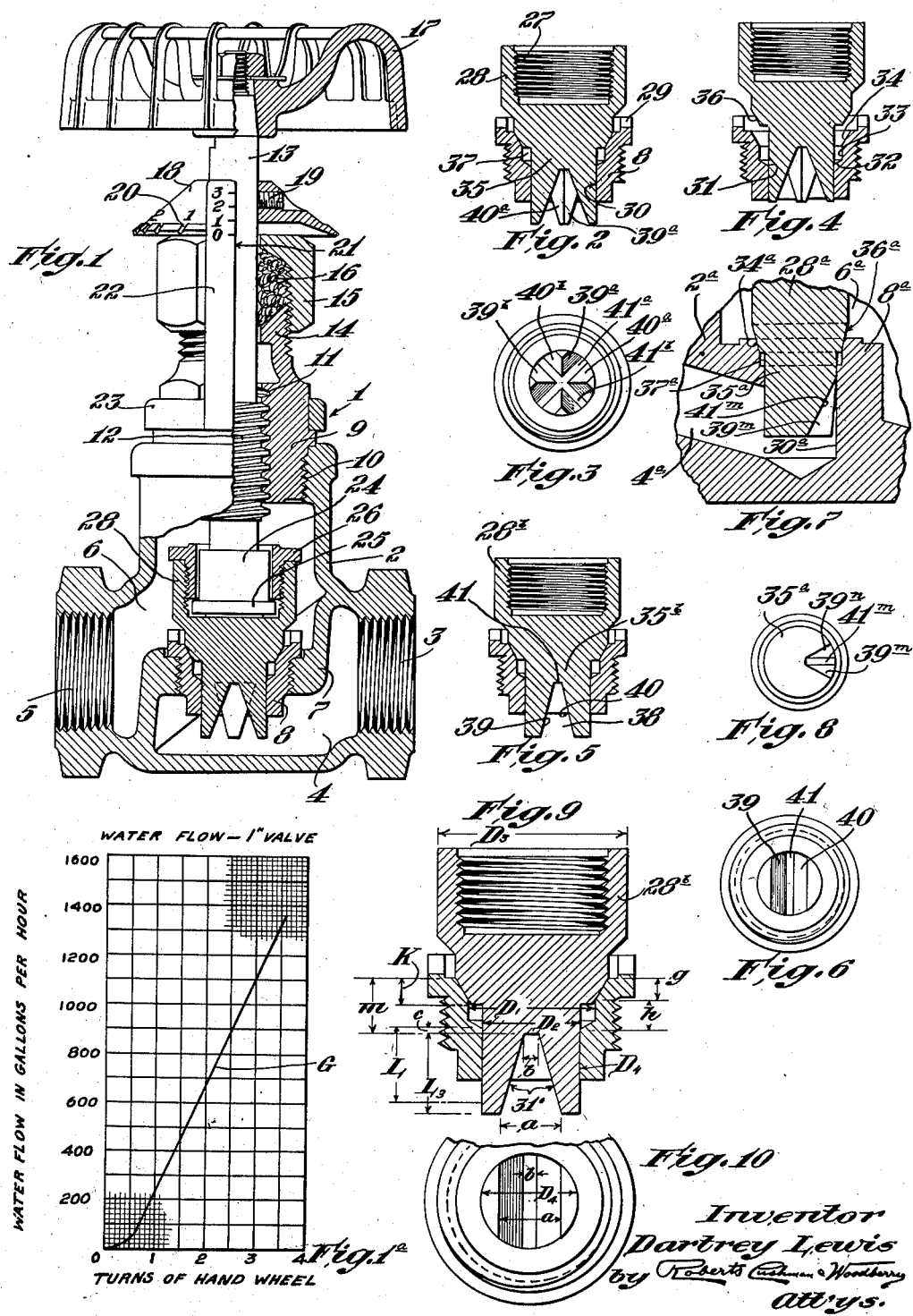

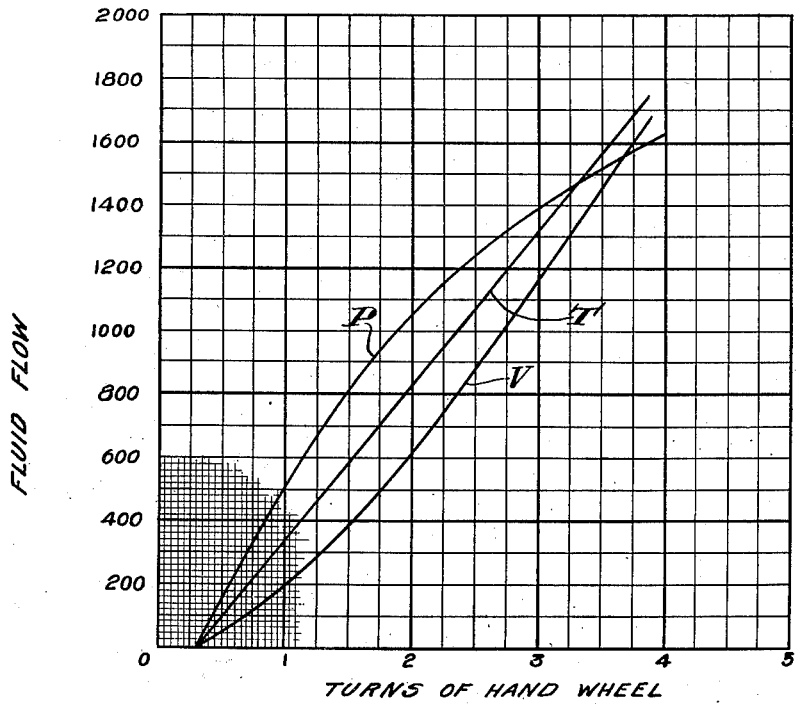

METERING VALVE

Filed March 27, 1936  4 Sheets-Sheet 3

Inventor
Dartrey Lewis
by Roberts Cushman & Woodberry
Att'ys.

May 10, 1938.                    D. LEWIS                      2,117,182
                              METERING VALVE
                         Filed March 27, 1936          4 Sheets-Sheet 4
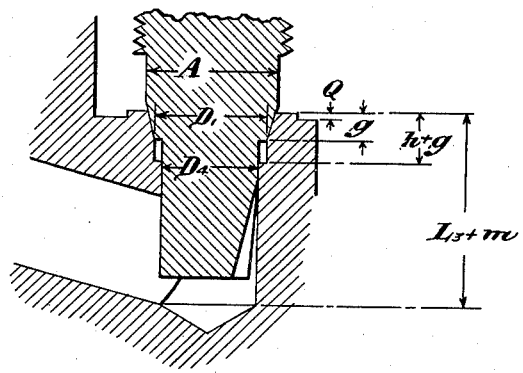
Fig. 16
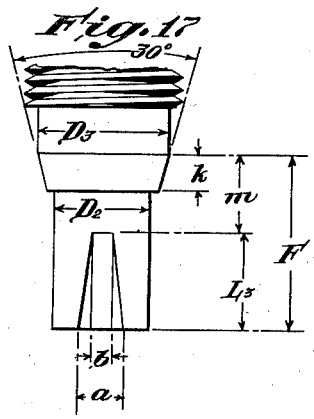
Fig. 17
| D | A | $D_1$ | $D_4$ | $L_3+m$ | $h+g$ | $g$ | $Q$ | $D_3$ | $D_2$ | $F$ | $L_3$ | $m$ | $k$ | $a$ | $b$ | Lift |
|---|---|---|---|---|---|---|---|---|---|---|---|---|---|---|---|---|
| 1/4 | .236 | .217 | .197 | .375 | .077 | .035 | 1/32 | .250 | .196 | .304 | .186 | .118 | .070 | .083 | .047 | .150 |
| 3/8 | .315 | .290 | .260 | 15/32 | .103 | .046 | 1/32 | .336 | .259 | .405 | .243 | .162 | .105 | .110 | .063 | .200 |
Fig. 18
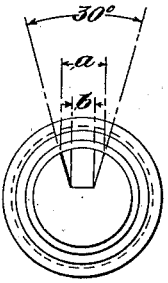
Fig. 17a
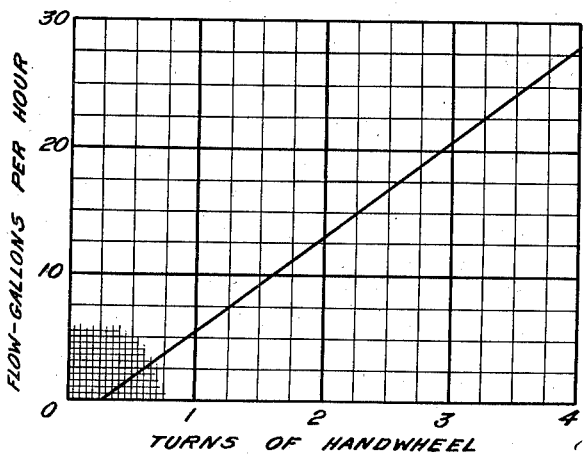
Fig. 19
Inventor
Dartrey Lewis
by Roberts Cushman & Woodberry
att'ys.

Patented May 10, 1938

2,117,182

UNITED STATES PATENT OFFICE 2,117,182

METERING VALVE

Dartrey Lewis, Boston, Mass., assignor, by mesne assignments, to Manning, Maxwell & Moore, Incorporated, New York, N. Y., a corporation of New Jersey Application March 27, 1936, Serial No. 71,097

9 Claims. (Cl. 251—34)

This invention pertains to valves for controlling the flow of fluid and relates more particularly to a metering valve so designed that within its range it is adjustable to deliver a predetermined amount of fluid accurately corresponding to each position of adjustment.

For certain purposes it is desirable to employ a valve as a fluid-measuring device,—the passage through the valve constituting a flow-measuring orifice at any given setting or adjustment of the valve. However, by reason of practical limitations of construction, the passage through a valve can not have the theoretical characteristics of a simple orifice and heretofore the ordinary valve could only be made available for accurate measuring purposes by a cut-and-try method of calibration under the actual conditions and environment of its intended use.

However, there is a demand for valves of commercial type so designed as to afford accurate flow-measuring and regulating means capable, without empirical calibration, of regulating the flow in substantially direct ratio to the movement of the hand wheel or other adjusting element. A principal object of the invention is to provide a valve having such desirable characteristics and capabilities.

In my copending application for Letters Patent Serial No. 12,399, filed March 22, 1935, I disclosed a valve device wherein the area of the orifice (defined between the stationary valve seat and the movable valve feather) varies in direct proportion to the movement of the hand wheel or other actuating element. While the valve structure therein disclosed is highly useful for certain purposes, it can not be depended upon, under all conditions of practical use, to insure a variation in the actual fluid flow, proportional to the lift.

As a matter of practical construction, the passage in a valve body, leading to and from the valve seat, is of such character as to exert a substantial effect upon the fluid flow and modifies the action of the orifice defined between the valve feather and seat. Among other factors, the frictional impedance of the flowing fluid by contact with the walls of the valve passage modifies the flow through the valve,—such frictional impedance varying substantially as the square of the velocity of the fluid. Since the velocity is different for different openings of the valve, a variable factor is thereby introduced.

Thus, if the area of the port (for example, a rectangular opening) vary directly as the lift of the valve head, the flow through the valve at low velocities (small lifts) may increase at a higher rate than the rate of opening but falls off rapidly at high velocities (large lifts). On the other hand, if the area of the port (for example, a triangular opening) vary as the square of the lift, the flow through the valve at low velocities (small lifts) may be unduly small but increases very rapidly at high velocities (large lifts).

After long experiment, it has been determined that by the employment of a valve port comprising, in combination, areas which increase directly as the lift and as the square of the lift, respectively, and by properly choosing an unvarying dimension of the first of said areas, it is possible to compensate for the friction losses at substantially all lifts of the valve so that the flow or quantity of fluid passing through the valve is in substantially direct ratio to the lift.

Accordingly, by the use of such a properly designed valve port and adjunctive parts, it is possible, merely by providing the hand wheel or other actuating element with uniformly graduated index means, to make a valve of commercial type which is operative under given pressure conditions to ensure fluid flow substantially in proportion to the movement of the hand wheel, without necessitating empirical graduation of each valve device for its particular conditions of use.

Other objects of the present invention are to provide a metering valve capable of embodiment in a simple, commercially practical, and durable construction, and, in certain illustrated embodiments in particular, to provide a construction which is capable of manufacture at relatively low cost by modern production methods.

Further objects and advantages will be made apparent in the following more detailed description and by reference to the accompanying drawings, in which—

Fig. 1 is a vertical section through the casing of the improved metering valve, showing the valve head seated to shut off fluid flow;

Fig. 1a is a diagram, graphically illustrating the relation between valve lift and the fluid flow in a one-inch valve of the species shown in Fig. 1 when the flowing fluid is water;

Fig. 2 is a section on substantially the same plane as Fig. 1, showing the valve seat and the valve head removed from the valve casing;

Fig. 3 is a bottom plan view of the parts shown in Fig. 2;

Fig. 4 is a view similar to Fig. 2 but showing the valve head raised from its seat;

Fig. 5 is a view similar to Fig. 2, but illustrating a modified form of valve head;

Fig. 6 is a bottom plan view of the parts shown in Fig. 5;

Fig. 7 is a fragmentary vertical section through a valve casing of modified construction and illustrating a valve head also of modified construction but embodying features of the present invention;

Fig. 8 is a bottom plan view of the valve head of Fig. 7;

Fig. 9 is a view similar to Fig. 5, but to larger scale, and provided with characters indicating various dimensions of the valve head and corresponding seat;

Fig. 10 is a bottom plan view of the metering plug forming a part of the valve head of Fig. 9;

Fig. 11 is a table showing desirable numerical values for the several dimensions which appear on Fig. 9 and which have been found desirable in the construction of valves of the species of Figs. 5 and 9;

Fig. 12 is a diagram showing, by comparison, the effects obtained by the use of valve orifices which vary directly as the valve lift, which vary as the square of the valve lift; and which vary in accordance with the principles of the present invention, respectively;

Fig. 16 is a diagrammatic sectional view of the valve of Fig. 7, to larger scale, provided with characters indicating various dimensions of the valve head and corresponding seat;

Fig. 17 is a diagrammatic elevation of the valve head of Fig. 16, also provided with dimensioning characters;

Fig. 17a is a bottom plan view of the metering plug of Fig. 17;

Fig. 18 is a table similar to that of Fig. 11, but applying to the species of valve illustrated in Figs. 7 and 16; and Fig. 19 is a graphic diagram illustrating the relation between valve lift and the fluid flow in a valve of the species illustrated in Figs. 7 and 16.

Figure 13:
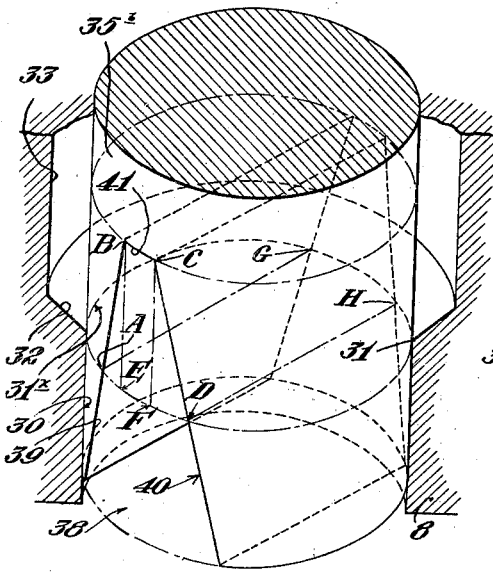
Figs. 13, 14 and 15 are diagrammatic perspective views illustrating the basic principles of the present invention.

In the following description, in which reference is made to the annexed drawings, such expressions as "top", "bottom", "raise", "lower", etc., are used merely for convenience in describing the structure as illustrated and are not to be understood as limiting the position in which the valve may be used. Moreover, when such terms as "cylindrical", "cylindrically curved", etc. are employed, they are to be understood in the broadest sense as inclusive of any surface generated by a substantially rectilinear generatrix following a directrix of any contour, whether curved or angular. For convenience the movable member of the valve structure which cooperates with the valve seat to shut off or control the flow of fluid is termed the "valve head" or "valve feather", terms commonly so used in the art and desirable in this connection to distinguish this movable part from the entire structure, which is commonly designated a "valve".

Referring to the drawings, one embodiment of the invention is illustrated in a valve 1 (Fig. 1) which comprises a casing 2 having the internal screw-threaded inlet 3 leading into the inlet chamber 4 within the lower part of the casing, the casing also being provided with the internally screw-threaded outlet 5 leading from the discharge chamber 6 in the upper part of the casing. Separating the inlet and outlet chambers there is a web 7, usually an integral part of the casing, having an internally screw-threaded aperture for the reception of the valve seat device 8, hereinafter more specifically described. The upper part of the casing 2 is provided with an internally screw-threaded bore for the reception of the plug-like lower end of a bonnet 9 having screw-threaded engagement with the casing at 10. This part 9 has an axial bore which is internally screw threaded, preferably with a relatively coarse thread at 11, for the reception of the screw-threaded portion 12 of a rotary valve stem 13. The upper part of the member 9 is externally screw threaded and constitutes a gland which enters an internally screw-threaded cap 15 having a cavity therein for the reception of packing material 16.

The upper end of the stem is furnished with a hand wheel 17 or equivalent device by means of which the stem may be turned, and, at a point intermediate the hand wheel and the upper end of the cap 15, the stem is provided with a dial member 18 secured by means of a set screw 19 or equivalent means to the stem 13. Preferably this dial 18 is of truncated conical form, its outer conical surface being provided near its lower margin with graduated notches 20 which are adapted to cooperate with graduations along the substantially vertical rectilinear edge 21 of an index member 22 carried by a collar 23 which is clamped about the member 9. The edge 21 is disposed substantially in a plane of the axis of the stem 13 and closely adjacent to the lower edge of the dial member 18. As the stem rises and falls in response to operation of the hand wheel 17, the lower edge of the dial moves up and down the edge 21, the graduations adjacent to said edge 21 being so spaced as to indicate complete turns of the valve stem. On the other hand, the graduations at the lower edge of the dial 18 cooperate with the edge 21 to indicate fractional turns of the stem.

At its lower end the valve stem is provided with a cylindrical enlargement 24 provided at its lower end with a radial flange 25. This flange is normally disposed beneath the lower edge of an externally screw-threaded sleeve 26 which engages an internally screw-threaded bore 27 (Fig. 2) in the upper part of the valve head or feather 28. Preferably the flange 25 is free to move to some extent within the space beneath the lower edge of the sleeve 26 so that the valve head may properly seat itself, an arrangement which is common in valves of this general class.

The upper edge of the seat device 8 preferably is provided with projections at 29 for the reception of a wrench or other tool by means of which it may be inserted within or removed from the aperture in the web member 7.

In a preferred construction, the seat device 8 comprises a substantially cylindrical bore 30 (Fig. 2) whose upper end is defined by the lower edge 31 (Fig. 4) of a downwardly convergent metering surface 32. This surface merges at its upper outer end with a substantially cylindrical surface 33 whose upper end in turn is defined by the lower edge of the upwardly divergent conical seat surface 34.

The valve head 28 comprises the metering plug portion 35 (Fig. 2) which is designed to have a free sliding fit within the cylindrical bore 30. Above the metering plug the valve head is furnished with a downwardly convergent conical surface 36 (Fig. 4) adapted to engage the seat surface 34 so as completely to shut off the fluid flow through the valve. Immediately below the lower edge of the surface 36 the diameter of the head 28 abruptly decreases so that when the valve head is seated, as illustrated in Fig. 2, there is a chamber 37 of substantial size between the lower edge of the seat surface 34 and the upper edge of the metering surface. When the valve starts to open, fluid which is permitted to enter through the metering channel in the plug, as hereinafter described, may freely enter this chamber 37 which is of larger radius than the passage 30 and which thereby avoids any possible constriction of the fluid on its way from the metering recess in the plug to the still larger orifice between the valve head and the valve seat.

Referring to Fig. 5, in which a simple form of metering recess or slot is illustrated, the valve head 28ᵇ, having the metering plug 35ᵇ, is provided with a single recess or slot 38 at its lower end, such slot extending diametrically across the metering plug and being open at the lower end of the plug, thereby to provide a metering channel or passage for the flow of fluid upwardly from below the plug. This recess or slot has the opposite substantially flat walls 39 and 40, respectively, which diverge downwardly with an included angle of the order of 30°—the upper end of the recess being defined by a substantially flat top or connecting wall 41 extending diametrically from one side to the other of the metering plug and which is substantially perpendicular to the axis of the head.

In Figs. 9 and 10 a valve head, such as illustrated in Fig. 5, is shown to somewhat larger scale and provided with dimensioning characters designating the various essential dimensions of the valve head and the seat. In this diagram the character $D^3$ represents the outside diameter of the valve head at its upper end. The character $D^1$ indicates the diameter of the chamber 37, this dimension also equaling the nominal valve size, which is hereafter referred to by the character D. The character $D^2$ indicates the outside diameter of the metering plug at its upper part where it cooperates with the metering surface; $D^4$ represents the internal diameter of the bore 30 in the seat device; L represents the maximum lift of the valve head from its seat; $L^3$ is the maximum vertical dimension of the recess or slot 38; $b$ represents the horizontal width of the surface 41 forming the upper wall of the slot; and $c$ represents the vertical distance between the surface 41 and the lower edge 31 of the metering surface 32 when the valve is closed. The character $m$ represents the distance between the surface 41 and the upper edge of the seat surface 34 when the valve is closed; the character $g$ represents the vertical distance between the upper and lower edges of the seat surface 34; the character K represents the vertical distance between the upper and lower edges of the beveled surface 36 of the valve head; the character $h$ represents the vertical distance between the lower edge 31 of the metering surface 32 and the lower edge of the seat surface 34; and the character $a$ represents the horizontal width of the recess 38 at its lower end.

In Fig. 11 desirable numerical values for these several dimensions have been tabulated for nominal valve sizes D varying from three-eighths of an inch to two inches. At the lower part of this table, the number of turns of the hand wheel necessary to provide full opening for each of these several sizes of valve is also indicated.

While the single transverse recess 38 is desirable, such a single recess restricts the capacity of the valve and for this reason it is preferred, under some circumstances, to employ the arrangement illustrated more particularly in Figs. 3 and 4, wherein the metering plug portion 35 of the valve head is furnished with a metering channel, which in effect consists of two intersecting diametrical recesses, each similar to the recess 38 but disposed at right angles to each other and intersecting at the central portion of the plug. Thus, as shown in Fig. 3, one of these recesses has the downwardly divergent side walls 39ᵃ and 40ᵃ and is terminated at its upper end by the flat surface 41ᵃ perpendicular to the axis of the stem, while the other of the intersecting recesses has the downwardly divergent walls 39ᵇ and 40ᵇ and is terminated at its upper end by the flat surface 41ᵇ. The two surfaces 41ᵃ and 41ᵇ thus form a cruciform figure, and at any horizontal section throughout the height of the recess such a figure is formed by the walls of the recess.

The general principle of operation involved in the improved valve as thus far described is diagrammatically indicated by way of example in Fig. 13 wherein a portion of the seat device is shown at 8, such seat device having the cylindrical bore 30, the metering surface 32, and the cylindrical wall 33 extending upwardly from the upper edge of the metering surface. The valve plug 35ᵇ has the single diametrical recess 38 provided with the downwardly divergent side walls 39 and 40 and the top wall 41.

It is obvious that the quantity of fluid which at any time may flow through the valve is determined by the degree to which the wall 41 at the top of the recess is raised above the lower edge 31 of the metering surface 32. In Fig. 13 the valve is shown as having been lifted so that the plane of the lower edge 31 of the metering surface (indicated by the broken line 31ˣ) intersects the recess so as to define a substantially rectangular figure ADHG in the plane of the metering surface. While the lines AD and HG are curved, this curvature may be disregarded in the following discussion and the area ADHG may be considered as a substantially rectangular port or orifice defining the lower end of a metering channel or passage into which the fluid enters from below and flows freely upwardly. The outlet from this channel or passage consists of two ports, at diametrically opposite sides of the plug, one of these ports being defined by the lines ADCB. In order that the flow may be determined by the size of these trapezoidal outlet ports, one of which is indicated at ADCB, the maximum lift of the valve head must be so restricted that at all lifts the area of the rectangular inlet port ADHG shall be larger than twice the area of the trapezoidal outlet port ABCD. In this connection, it may be noted that the areas ADHG and the combined areas ADCB at all lifts of the valve, in effect constitute inlet and outlet ports terminating or defining the ends of a passage (of variable length) which conducts fluid from the inlet chamber 4 below the plug to the chamber 37.

The area of each individual outlet port ABCD may be divided into a rectangular area BCFE and the two marginal triangular areas ABE and FCD, which may be considered together as constituting a single triangular area.

Considering the rectangular port area EBCF alone, the flow through such an area would be substantially directly proportional to the lift of the valve, since the width EF (or BC) of this area does not change,—while the height EB of this area varies directly with the valve lift. On the other hand, the triangular area or port comprising the two areas ABE and FCD varies as the square of the valve lift, since both its vertical height EB and its base (AE plus FD) vary with the lift of the valve.

Referring to Fig. 12, the curved graph line P indicates the variations in the quantity of fluid which may be expected to flow through a port opening of rectangular form whose area is made to vary in direct proportion to the turns of the hand wheel. It will be noted from inspection of this graph that, as the valve is opened in response to the turning of the hand wheel, the flow increases quite rapidly for low velocities, that is, at low openings, but falls off rapidly as the valve is more fully opened, this being due to the rapidly increasing effect of friction as the velocity of fluid flow through the valve increases.

On the other hand, the graph line V indicates the effect produced by the use of a triangular port opening whose area increases substantially as the square of the valve lift. With such an arrangement the flow at low lift, when using practical dimensions of the port, is unduly low but increases with great rapidity as the valve is opened, the rapidly increasing size of the port overcompensating the increasing effect of friction at the higher velocities.

In comparison, the graph line T represents results such as may be obtained by employing a port of equilateral trapezoidal shape, which in effect is a combination of the rectangular and triangular forms, such as illustrated in Fig. 13. By choosing a proper width $b$ for the surface 41 and thus for the rectangular area EBCF, it is possible to obtain a relationship of flow area to lift such that, for constant external pressure conditions, the flow of fluid through the valve will be in substantially direct proportion to the lift, this effect being indicated by the substantially straight graph line T (Fig. 12).

It has been found experimentally that, in general, if the width $b$ be so chosen that $b$ equals from 15% to 75% of $t$ (where $b$ is the upper or narrow base BC of the trapezoidal port, and $t$ is the lower or wider base AD of the trapezoidal port ABCD at maximum valve opening), the flow through the valve will be substantially proportional to the lift,—the exact value of $b$ varying with the valve size.

Thus, for example, for a valve of the type illustrated in Fig. 9, the relation $$\frac{b}{t}$$

for various nominal valve sizes is substantially as follows:

| Nominal valve size D | ⅜″ | ½″ | ¾″ | 1″ | 1¼″ | 1½″ | 2″ |
|---|---|---|---|---|---|---|---|
| $\frac{b}{t}$ | 0.264 | 0.198 | 0.201 | 0.210 | 0.162 | 0.171 | 0.154 |

For valves of the type illustrated in Fig. 7, which are usually of small size, the ratio $$\frac{b}{t}$$

for different nominal valve sizes, is substantially as follows:

| Nominal valve size D | ¼″ | ⅜″ |
|---|---|---|
| $\frac{b}{t}$ | 0.746 | 0.643 |

Referring to Figs. 7 and 8, a modified construction is illustrated wherein the valve casing, the valve seat, and the valve head are made of simpler form than the corresponding parts in Fig. 1 and such that they may be made by commercial production methods with great rapidity and at low cost. Without here considering non-essential details of the valve casing nor of the valve stem (which is integral in this case with the valve head 28ª) nor the other adjunctive parts of the valve structure which form no necessary part of the present invention, it suffices to refer to the valve seat structure and the valve head together with its metering plug and recess.

In this construction the valve casing 2ª is furnished with an inlet chamber 4ª, the seat structure 8ª (which is integral with the casing) and the outlet chamber 6ª above the seat structure. The seat structure is provided with the cylindrical bore 30ª (Fig. 14) whose upper end is defined by the metering surface 32ª which in this case is substantially perpendicular to the axis of the valve head. Above the surface 32ª the wall of the bore 30ª is expanded in diameter as shown at 33ª so as to form a chamber 37ª (Fig. 7) above the metering surface. The upper end of the wall 33ª defines the lower edge of the downwardly convergent conical seat surface 34ª with which cooperates the conical surface 36ª of the valve head 28ª. The valve head has the integral metering plug portion 35ª which slides in the cylindrical bore 30ª and which, as illustrated in Figs. 7 and 8, is furnished at one side with a metering channel or recess 38ª (Fig. 14) which at any horizontal cross section is of truncated V-shape. This channel or passage has the side walls 39ᵐ and 39ⁿ which diverge from each other both downwardly and horizontally,—the angle of divergence in any horizontal plane preferably being of the order of 30°, the inner, top, or connecting wall 41ᵐ of the recess being a substantially flat surface which slopes from the peripheral surface of the plug downwardly and inwardly toward the axis of the plug. This slot, notch, or recess 38ª is open at its lower end, and when the plug is lifted so that the upper part of the recess is raised above the metering surface 32ª, the recess affords a passage for fluid from the chamber 4ª to the chamber 6ª,—the degree to which the upper part of the recess is raised above the metering surface 32ª determining the amount of flow at any particular time.

In Figs. 16 and 17, dimensioning characteristics corresponding in definition to those applied to Fig. 9 are applied to a valve of the species illustrated in Fig. 7, and in Fig. 18 desirable numerical values for the several dimensions have been tabulated for two nominal valve sizes D, to wit, ¼″ and ⅜″, it being noted that this species of valve is intended particularly for small sizes.

Figure 14:
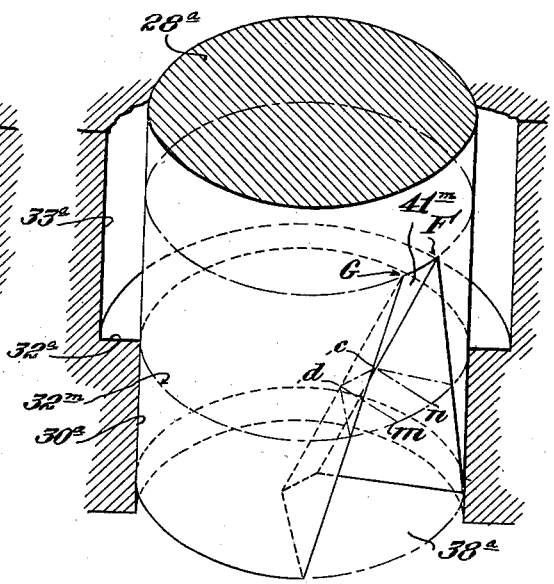
Figure 15:
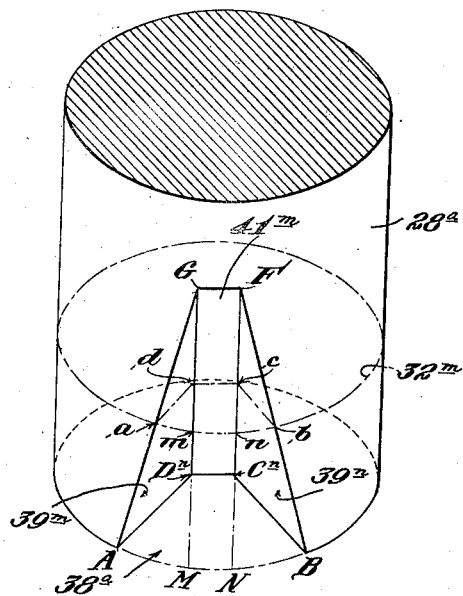

The principle of operation of this particular form of recess is illustrated more in detail in Figs. 14 and 15. Referring to Fig. 14, the broken line 32ᵐ represents the plane of the metering surface 32ª. The metering plug 28ª is shown as arranged to slide in the cylindrical bore 30ª and as having been raised somewhat from the closed position of the valve so that the upper part of the recess 38ª is above the plane of the metering surface 32ª.

Considering the plane 32ᵐ (particularly by reference to Fig. 15) it may be noted that it cuts the recess in a horizontal plane so as to form the trapezoidal figure $abcd$, such figure being of less area than the area $aGFb$, which latter area represents the intersection of the recess with the peripheral surface of the plug where it is exposed above the metering surface. In the following discussion it is assumed that the lines $ab$, AB and GF are straight lines (although they are in fact curved, the effect of the curvature being substantially negligible). In designing the valve, the angle C$^n$FB is so chosen that the area of the outlet port aGFb is always larger than the area of the trapezoidal inlet port adcb so that the size of the latter area at any given time may determine the flow through the valve. This inlet port area adcb may be considered as consisting of two areas, one mncd, which is rectangular, and the other consisting of two triangles adm and ncb, which together may be regarded as constituting a single triangle. That portion of this horizontal port area consisting of the rectangular part mncd varies in but one dimension only, that is to say, its length md as the valve is opened or closed, its widthwise dimension dc remaining constant. Thus this rectangular port area permits fluid flow in substantially direct proportion to the opening or lift of the valve. On the other hand, the triangular area comprising the sum of areas adm and ncb varies both in the length of its base (am plus nb) and in its height md as the valve is opened and closed, so that the fluid flow through this portion of the area is substantially proportional to the square of the lift. Thus by properly selecting the width GF of the rear or top wall 41$^m$ of the recess, it is possible, in the same way as in the construction previously described, to provide for a flow of fluid through the valve which is in substantially direct proportion to the valve lift. While the metering plug 28$^a$ is here shown as provided with but one recess 38$^a$, it is obvious that it may be provided with a plurality of such recesses for the purpose of increasing the capacity of the valve, without departing from the principle of the invention as exemplified in the employment of a single recess.

A valve of the species illustrated in Figs. 5 and 9 for controlling the flow of water is found under actual conditions to have characteristics such as indicated graphically in Fig. 1$^a$. This figure illustrates experimental determination of the flow of water through a one-inch valve having a metering plug and recess such as herein described, operating under conditions of substantially constant external pressure, the graph line G clearly showing that after the first fractional opening of the valve, the flow increases in substantially direct ratio to the turns of the hand wheel, that is to say, to the lift of the valve from its seat.

Fig. 19 is a diagram similar to that of Fig. 1$^a$, illustrating the results of experimental determination of the flow of water through a valve of the species illustrated in Fig. 7 operating under a pressure drop of ten pounds.

While hereinabove there have been described certain desirable embodiments of the invention together with specific details of construction and dimensions of parts useful in obtaining the desired result, it is to be understood that the invention is not to be limited to the particular features specifically described but is to be considered as broadly inclusive of any equivalent arrangements such as fall within the scope of the appended claims.

I claim:

1. A metering valve designed to insure fluid flow substantially directly proportional to the linear separation of the valve head from its seat, said valve including a seat device having an annular valve seat, a valve head including an elongate metering member of substantially uniform horizontal cross section, the seat device having therein a guideway in which said elongate member slides, said seat device also having a metering surface which intersects said guideway, the metering member and the wall of the guideway cooperating to form a metering channel which is terminated at one end by an outlet port and at its other end by a trapezoidal inlet port, the area of the latter port, at least, varying as the head is moved toward and from the seat, the area of the outlet port always being greater than that of the inlet port so that the size of the inlet port determines the rate of flow through the valve, the total area of said inlet port, at any lift, being divisible into a substantially rectangular part whose size varies directly with the lift of the valve head from its seat and two triangular parts whose composite area is the equivalent of a single substantially triangular part whose area varies substantially as the square of the lift, the width b of the narrower base of the inlet port and the width t of the wider base of said port at maximum lift being so related that $$\frac{b}{t} = \text{from } 0.15$$

for valves of approximately 2 inches nominal size to 0.75 for valves of approximately ¼ inch nominal size.

2. A metering valve designed to insure fluid flow in substantially direct proportion to the linear separation of the valve head from its seat, said valve including a seat device having an annular seat surface, a valve head including an elongate metering member, the seat device having therein a guideway in which said elongate metering member slides, said seat device also having a metering surface which intersects the guideway, the metering member and the wall of the guideway cooperating to form a metering channel, which, when the valve is open, has at one end, at least, a port of substantially trapezoidal shape and of variable size, and a stem operative to move the valve head toward and from the seat, the metering channel in the head having side walls which diverge from each other at an angle of the order of 30° and having an inclined connecting wall which is of substantially uniform width, the width b of said connecting wall and the width t of the wider base of said port at maximum lift being so related that $$\frac{b}{t} = \text{from } 0.15$$

for valves of approximately 2 inches nominal size to 0.75 for valves of approximately ¼ inch nominal size.

3. A metering valve designed to insure fluid flow in substantially direct proportion to the linear separation of the valve head from its seat, said valve including a seat device having an annular valve seat, a valve head including an elongate metering member of substantially uniform horizontal cross section, the seat device having therein a guideway in which said elongate member slides, said seat device also having a metering surface which intersects the guideway, the metering member and the wall of the guideway cooperating to form a metering channel having an outlet port and an inlet port, one of said ports being of trapezoidal shape and varying in size as the valve head moves toward and from its seat, the respective ports being of such relative size that the trapezoidal port determines the rate of flow through the valve, the total area of said latter port at any lift being divisible into a substantially rectangular part whose area varies in direct ratio to the lift of the valve head from its seat and a part which is made up of two triangular portions whose combined areas are the equivalent of a single triangular part whose area varies substantially as the square of the lift, the width $b$ of the narrow base of said fluid determining port and the width $t$ of the wider base of said port at maximum valve opening being so related that $$\frac{b}{t} = \text{from 0.15 to 0.75}$$

whereby the flow through the valve is caused to vary in substantially direct ratio to the lift of the valve head from its seat.

4. In a metering valve designed to insure fluid flow in substantially direct proportion to the linear separation of the valve head from its seat, said valve comprising a valve casing, a movable valve head, a seat structure within the casing, said seat structure having a substantially cylindrical guideway terminating in an annular metering surface, an annular shut-off seat surface coaxial with but spaced from the metering surface, means for moving the valve head toward and from the seat surface, a metering plug secured to the head and sliding in said passage, said plug having therein a metering recess comprising divergent side walls and a connecting wall, the latter wall being of substantially rectangular contour, the points at which the inner edge of the metering surface intersects said divergent side walls respectively defining the opposite ends of the longer base of a substantially trapezoidal port, the opposite ends of whose shorter base are in the lines of intersection of said divergent side walls with the connecting wall respectively, said divergent side walls being so relatively arranged that said trapezoidal port comprises two triangular portions whose combined areas are the equivalent of a single triangular portion whose area varies substantially as the square of the lift of the valve head from the shut-off surface and a rectangular part those area varies in direct ratio to the lift of the valve head from said shut-off surface, the width $b$ of the narrow base of the port and the width $t$ of the wider base of said port at maximum lift being so related that $$\frac{b}{t} = \text{from 0.15 to 0.75}$$

whereby, under conditions of substantially constant external pressure, the quantity of fluid delivered by the valve device at any given lift is substantially directly proportional to the movement of the valve head toward and from said shut-off surface.

5. In a metering valve designed to insure fluid flow in substantially direct proportion to the linear separation of the valve head from its seat, said valve comprising a valve casing, a movable valve head, a seat structure within the casing, said seat structure having a substantially cylindrical guideway terminating in an annular metering surface, and an annular shut-off seat surface coaxial with but spaced from the metering surface thereby to provide an annular chamber interposed between said surfaces, a metering plug secured to the head and sliding in said passage, said plug having therein a metering recess comprising side walls which diverge from each other at an angle of the order of 30°, and a connecting wall of substantially rectangular contour, the points at which the inner edge of the metering surface intersect said divergent side walls, respectively, defining the opposite ends of the longer base of a substantially trapezoidal port, the opposite ends of whose shorter base are in the lines of intersection of said divergent side walls with the connecting wall, respectively, said walls being so relatively arranged that at all lifts the port comprises two triangular portions whose combined area is the equivalent of a single triangular portion whose area varies substantially as the square of the lift of the valve head from the shut-off surface and a rectangular part whose area varies in direct ratio to the lift of the valve head from said shut-off surface, the width $b$ of the narrow base of the port and the width $t$ of the wider base of said port at maximum lift being so related that $$\frac{b}{t} = \text{from 0.15 to 0.75}$$

whereby, under conditions of substantially constant external pressure, the quantity of fluid delivered by the valve device varies directly as the lift of the valve head from the shut-off surface.

6. A metering valve designed to insure fluid flow in substantially direct proportion to the linear separation of the valve head from its seat, said valve including a seat device having an annular seat surface, a valve head including an elongate metering member, the seat device having therein a guideway in which said elongate metering member slides, said seat device also having a metering surface which intersects the guideway, the metering member and the wall of the guideway cooperating to form a metering channel, which, when the valve is open, has an outlet comprising a plurality of ports each of substantially trapezoidal shape and of variable size, and a stem operative to move the valve head toward and from the seat, the metering channel in the head having side walls which diverge from each other at an angle of the order of 30° and having a connecting wall which is of substantially uniform width and which is substantially perpendicular to the axis of the metering member, the width $b$ of said connecting wall and the width $t$ of the wider base of said port at maximum lift being so related that $$\frac{b}{t} = \text{from 0.15}$$

for valves of approximately 2 inches nominal size to 0.75 for valves of approximately ¼ inch nominal size.

7. A metering valve designed to insure fluid flow in substantially direct proportion to the linear separation of the valve head from its seat, said valve including a seat device having an annular valve seat, a valve head including an elongate metering member of substantially uniform horizontal cross section, the seat device having therein a guideway in which said elongate member slides, said seat device also having a metering surface which intersects the guideway, the metering member and the wall of the guideway cooperating to form a metering channel having an inlet port of substantially rectangular contour and an outlet comprising a plurality of ports each of trapezoidal shape and which vary in size as the valve head moves toward and from its seat, the inlet port at all valve lifts being larger than the combined areas of the outlet ports at the corresponding lift whereby the trapezoidal ports determine the rate of flow through the valve, the total area of each outlet port at any lift being divisible into a substantially rectangular part whose area varies in direct ratio to the lift of the valve head from its seat and a part which is made up of two triangular portions whose combined areas are the equivalent of a single triangular part whose area varies substantially as the square of the lift, the width $b$ of the narrow base of each outlet port and the width $t$ of the wider base of said port at maximum valve opening being so related that $$\frac{b}{t}=\text{from } 0.15 \text{ to } 0.75$$

whereby the flow through the valve is caused to vary in substantially direct ratio to the lift of the valve head from its seat.

8. In a metering valve designed to insure fluid flow in substantially direct proportion to the linear separation of the valve head from its seat, said valve comprising a valve casing, a movable valve head, a seat structure within the casing, said seat structure having a substantially cylindrical guideway terminating in an annular metering surface, an annular shut-off seat surface coaxial with but spaced from the metering surface, means for moving the valve head toward and from the seat surface, a metering plug secured to the head and sliding in said passage, said plug having therein a metering recess open at its lower end to provide an inlet port and comprising divergent side walls and a connecting wall which is substantially perpendicular to the axis of the plug, the points at which the inner edge of the metering surface intersect said divergent side walls respectively defining the opposite ends of the longer base of a substantially trapezoidal outlet port, the opposite ends of whose shorter base are in the lines of intersection of said divergent side walls with the connecting wall respectively, said divergent side walls being so relatively arranged that said trapezoidal outlet port comprises two triangular portions whose combined areas are the equivalent of a single triangular portion whose area varies substantially as the square of the lift of the valve head from the shut-off surface and a rectangular part whose area varies in direct ratio to the lift of the valve head from said shut-off surface, the width $b$ of the narrow base of the outlet port and the width $t$ of the wider base of said outlet port at maximum lift being so related that $$\frac{b}{t}=\text{from } 0.15 \text{ to } 0.75$$

whereby, under conditions of substantially constant external pressure, the quantity of fluid delivered by the valve device at any given lift is substantially directly proportional to the movement of the valve head toward and from said shut-off surface.

9. In a metering valve designed to insure fluid flow in substantially direct proportion to the linear separation of the valve head from its seat, said valve comprising a valve casing, a movable valve head, a seat structure within the casing, said seat structure having a substantially cylindrical guideway terminating in an annular metering surface, and an annular shut-off seat surface coaxial with but spaced from the metering surface thereby to provide an annular chamber interposed between said surfaces, a metering plug secured to the head and sliding in said passage, said plug having therein a metering recess open at the lower end of the plug to provide an inlet port, the recess being substantially cruciform at any horizontal section, each arm of the recess having side walls which diverge from each other at an angle of the order of 30°, the recess having a substantially cruciform top wall substantially perpendicular to the axis of the plug, the points at which the inner edge of the metering surface intersect said divergent side walls, respectively, defining the opposite ends of the longer bases of a plurality of substantially trapezoidal outlet ports the opposite ends of whose shorter bases are in the lines of intersection of said divergent side walls with the top wall, respectively, said walls of the recess being so relatively arranged that at all lifts each outlet port comprises two triangular portions whose combined area is the equivalent of a single triangular portion whose area varies substantially as the square of the lift of the valve head from the shut-off surface and a rectangular part whose area varies in direct ratio to the lift of the valve head from said shut-off surface, the width $b$ of the narrow base of the port and the width $t$ of the wider base of said port at maximum lift being so related that $$\frac{b}{t}=\text{from } 0.15 \text{ to } 0.75$$

whereby, under conditions of substantially constant external pressure, the quantity of fluid delivered by the valve device varies directly as the lift of the valve head from the shut-off surface.

DARTREY LEWIS.